(12) United States Patent
Lyon

(10) Patent No.: US 10,768,054 B2
(45) Date of Patent: Sep. 8, 2020

(54) TEMPERATURE SENSING ELECTRICAL DEVICE

(71) Applicant: TE CONNECTIVITY CORPORATION, Berwyn, PA (US)

(72) Inventor: Zachary Wood Lyon, Lewisville, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 325 days.

(21) Appl. No.: 15/825,456

(22) Filed: Nov. 29, 2017

(65) Prior Publication Data

US 2019/0162603 A1    May 30, 2019

(51) Int. Cl.
| | | |
|---|---|---|
| *G01K 7/16* | (2006.01) | |
| *H01R 4/2454* | (2018.01) | |
| *H01R 13/11* | (2006.01) | |
| *B60L 53/14* | (2019.01) | |
| *G01K 1/14* | (2006.01) | |

(Continued)

(52) U.S. Cl.
CPC ............... *G01K 7/16* (2013.01); *B60L 53/14* (2019.02); *G01K 1/143* (2013.01); *H01R 4/2454* (2013.01); *H01R 13/111* (2013.01); *H01R 13/6683* (2013.01); *B60L 2230/12* (2013.01); *B60L 2240/36* (2013.01); *H01C 7/022* (2013.01); *H01C 7/04* (2013.01); *H01R 13/504* (2013.01); *H01R 13/64* (2013.01); *H01R 2201/26* (2013.01)

(58) Field of Classification Search
CPC .......... G01K 7/16; G01K 1/143; B60L 53/14; B60L 2230/12; B60L 2240/36; H01R 4/2454; H01R 13/111; H01R 13/6683; H01R 13/504; H01R 13/64; H01R 2201/26; H01R 4/24; H01C 7/022; H01C 7/04

See application file for complete search history.

(56) References Cited

U.S. PATENT DOCUMENTS 4,462,020 A * 7/1984 May .................. H01C 3/20
                                                      29/612
4,727,239 A * 2/1988 Lupoli .................. H05B 3/04
                                                      123/142.5 E (Continued)

FOREIGN PATENT DOCUMENTS

| CN | 203707359 U | 7/2014 |
|---|---|---|
| CN | 203883139 U | 10/2014 |
| WO | 2017081348 A1 | 5/2017 |

OTHER PUBLICATIONS

International Search Report, International Application No. PCT/IB2018/058907, International Filing Date, Nov. 13, 2018.

*Primary Examiner* — Lisa M Caputo
*Assistant Examiner* — Philip L Cotey

(57) ABSTRACT

A sensor assembly includes an upper shell and a lower shell and is configured to mate together. The upper and lower shells form a cavity therebetween that extends along a length of the shells. The cavity is configured to receive a wire having an insulated jacket and a conductor. A contact member is positioned within the cavity and configured to pierce the insulated jacket and engage the conductor to establish a direct thermally conductive path to a discrete location of a main circuit. A sensor operatively connects with the contact member and is configured for detecting a temperature of the discrete location through the direct thermally conductive path.

19 Claims, 4 Drawing Sheets

(51) Int. Cl.
   *H01R 13/66* (2006.01)
   *H01C 7/04* (2006.01)
   *H01C 7/02* (2006.01)
   *H01R 13/64* (2006.01)
   *H01R 13/504* (2006.01)

(56) References Cited

U.S. PATENT DOCUMENTS

| | | | |
|---|---|---|---|
| 5,429,530 A * | 7/1995 | Zander | H01R 4/2429 |
| | | | 439/411 |
| 8,007,310 B2 | 8/2011 | Landis et al. | |
| 8,109,783 B2 | 2/2012 | Bishop et al. | |
| 8,568,157 B2 | 10/2013 | Bishop | |
| 8,758,041 B2 | 6/2014 | Bishop et al. | |
| 9,837,730 B1 * | 12/2017 | Rahman | H01R 4/2408 |
| 2009/0318014 A1 * | 12/2009 | McCauley | H01R 13/533 |
| | | | 439/485 |
| 2011/0117794 A1 | 5/2011 | Landis et al. | |
| 2014/0285969 A1 * | 9/2014 | Kojima | H01G 4/38 |
| | | | 361/689 |
| 2015/0140855 A1 * | 5/2015 | Jones | H01R 11/20 |
| | | | 439/391 |
| 2016/0137079 A1 | 5/2016 | Jefferies et al. | |
| 2018/0375226 A1 * | 12/2018 | Rodilla Sala | H01R 4/42 |

* cited by examiner

TEMPERATURE SENSING ELECTRICAL DEVICE

BACKGROUND OF THE INVENTION

The subject matter herein relates generally to an electrical device having a temperature sensing device with an insulation displacement contact.

Temperature sensors, such as negative temperature coefficient (NTC) thermistors or positive temperature coefficient (PTC) thermistors, are used in many high amperage applications for monitoring the temperature of components for the purpose of safety and operation. For example, plug-in electric vehicles (EVs), including all-electric cars and plug-in hybrids, receive power from an electric vehicle charging station, also called an Electric Vehicle Supply Equipment (EVSE) through a standardized interface, such as, a plug connector for coupling with a mating receptacle connector of the EV, such as an interface defined by an industry standards SAE J1772, IEC 62196, VDE-AR-E 2323-2-2, EV-Plug Alliance, and/or CHAdeMO. The plug connector is electrically connected to a power source through a high amperage circuit and provides power to the EV according to an industry standard or level. As an example, an EVSE providing power according to a Level 2 alternating current (AC) charging standard, may provide up to 80 Amps charging current to the connected EV.

Resistive heating, also referred to as joule heating or ohmic heating, occurs in the high amperage circuit at discrete locations, such as junctions and/or connection points that connect the components of the EVSE and EV. In addition, resistive heating may increase at these locations due to various parameters or conditions, such as manufacturing tolerances, mechanical ageing and reduction of contact pressure, chemical corrosion or oxidation of mating surfaces, or misuse and abuse leading to degraded performance. Potentially, increased resistance may lead to overheating and damage to the components of the EVSE and/or EV during operation.

For reasons such as safety, cost, and/or design parameters, temperature sensors are not placed in direct contact with the discrete locations to be monitored. Rather, temperature sensors are positioned at a distance from the connection point to indirectly or passively sense the temperature through a thermally conductive path between the discrete location and the temperature sensor. For example, to monitor temperature fluctuations of the connection point between a connector and wire conductor, the temperature sensor may attach to an outer surface, such as an insulated jacket of the wire conductor, of the wire conductor at a distance along the wire conductor from the connection point with an attachment member, such as a spring clip, a metal grasping clip, a clamp, and the like. The resistive heat at the connection point conducts through the thermally conductive path defined by the wire conductor, insulated jacket, and attachment member to the temperature sensor. The effectiveness of the temperature sensor to rapidly and accurately sense the temperature changes at the connection point is related to the length and thermal conductivity of the thermally conductive path. Thus, as the length increases and the thermal conductivity lowers, the effectiveness of the temperature sensor decreases. In addition, the attachment members may be subject to environmental conditions, such as vibration, temperature, and the like that decrease the effectiveness of the temperature sensor.

Accordingly, there is a need for a temperature sensing device that effectively senses temperature changes at a connection point.

BRIEF DESCRIPTION OF THE INVENTION

In one embodiment, a sensor assembly includes an upper shell and a lower shell configured to mate together with the upper shell. The upper and lower shells form a cavity therebetween that extends along a length of the shells. The cavity is configured to receive a wire having an insulated jacket and a conductor. A contact member is positioned within the cavity and configured to pierce the insulated jacket and engage the conductor to establish a direct thermally conductive path to a discrete location of a main circuit. A sensor operatively connects with the contact member, the sensor being configured for detecting a temperature of the discrete location through the direct thermally conductive path.

In another embodiment, a sensor assembly includes a housing with a front end and a rear end having an opening into a cavity. The housing forms from upper and lower shells mating together along an interface that extends along a portion of the shells. The upper and lower shells form the cavity therebetween that extends along a length of the shells. The cavity is configured to receive a wire having an insulated jacket and a conductor. The wire is configured for electrical connection to a main circuit. An electrical insulation displacement terminal mounts within the cavity of the housing. The electrical insulation displacement terminal is configured to pierce the insulated jacket and engage the conductor to establish a direct thermally conductive path to a discrete location along the main circuit. A sensor thermally connects with the electrical insulation displacement terminal, the sensor being configured for detecting a temperature of the discrete location through the direct thermally conductive path.

In yet another embodiment, an electrical device, includes a power supply; a load, and a circuit electrically connected between the power supply and the load, the circuit having a wire with an insulated jacket and a conductor. A housing includes a front end and a rear end having an opening into a cavity. The housing forms from upper and lower shells mating together along an interface that extends along a portion of the shells. The upper and lower shells form the cavity therebetween that extends along a length of the shells. An electrical insulation displacement terminal mounts within the cavity of the housing. The electrical insulation displacement terminal is configured to pierce the insulated jacket and engage the conductor to establish a direct thermally conductive path to a discrete location along the circuit. A sensor thermally connects with the electrical insulation displacement terminal, the sensor being configured for detecting a temperature of the discrete location through the direct thermally conductive path.

DETAILED DESCRIPTION OF THE INVENTION

Embodiments described herein include electrical devices that have an an electrical connector, a mating electrical connector, and a sensor assembly to sense a temperature of a discrete location of an electrical circuit through a direct thermally conductive path. The sensor assembly may have a variety of configurations as set forth herein.

Figure 1:
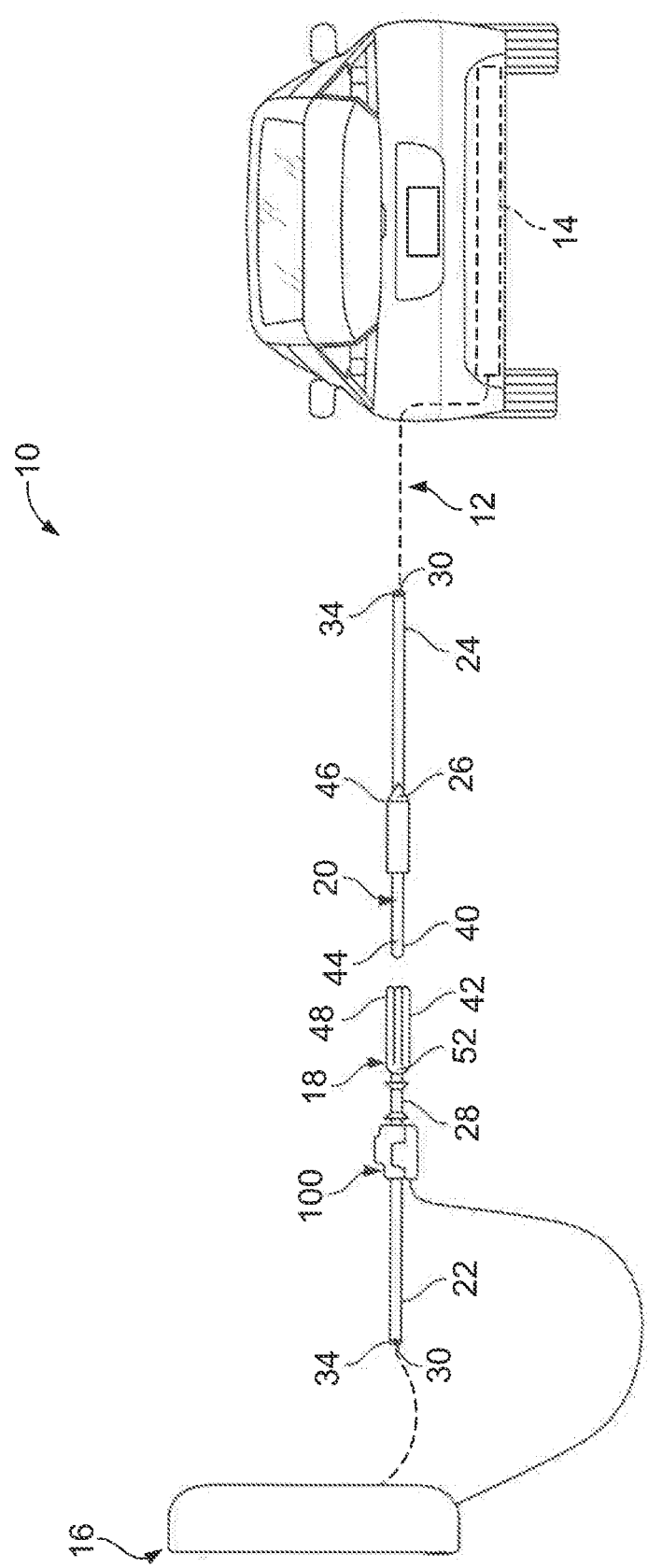
FIG. 1 is a schematic view of an electrical device according to an embodiment.

FIG. 1 is a schematic view of an electrical device 10 according to an embodiment. The electrical device 10 is located and electrically connected within the electrical charging system that includes a main power circuit 12 having a load 14, and a power supply 16. The electrical device 10 includes an electrical connector 18, mating electrical connector 20, and corresponding wires 22 and 24 at connection points 26, 28. A sensor assembly 100 operatively connected, such as thermally and/or mechanically, with the wire 22 for sensing temperature conditions at a discrete location defined by the connection point 28. In alternate embodiments, the sensor assembly 100 may be used at multiple discrete location(s) at any location along the circuit 12 where temperature may fluctuate due to resistive heating or other factors. For example, discrete locations may include connector interfaces, wire terminations, electrical connection points, electrical junctions, and the like. Optionally, the discrete locations may be at any location along the main power circuit 12 including remote from connection points 26, 28.

The sensor assembly 100 may electrically connect with the power supply 16 for communicating signals associated with the temperature conditions. The power supply 16 may include an electrical component, such as a controller (not shown) to process the signals from the sensor assembly 100 for use in operation of the electrical device 10. For example, during operation the sensor assembly 100 may send a signal to the power supply 16 indicating that the temperature at the connection point 28 has exceeded a threshold. In turn, the power supply 16 may stop sending power through the main power circuit 12.

In an exemplary embodiment, the main power circuit 12 is a high amperage power circuit for an automotive application. As illustrated, the power supply 16 defines an electric vehicle charging station, also called an Electric Vehicle Supply Equipment (EVSE), and the load 14 defines a plug-in electric vehicle (EV). Optionally, the EVSE may provide power up to 80 Amps of charging current according to a SAE J1772 Level 2 alternating current (AC) charging standard. However, the main power circuit 12 may use any power supply, any amperage, or any charging standard. In alternative embodiments, the electrical device 10 may have applications other than automotive applications, including, but not limited to relays, motors, batteries, inverters, power distribution systems, and the like.

In the exemplary embodiment, each of the wires 22, 24 includes an electrical conductor 30 and an insulating jacket 34. In other embodiments, each of the wires 22, 24 may be shielded along at least a portion of the length of the wire 22, 24, and unshielded along at least a portion of the length of the wire 22, 24 for coupling with the sensor assembly 100. The wires 22, 24 may be shielded using any suitable arrangement, configuration, structure, means, and/or the like, such as, but not limited to, surrounding at least a portion of the electrical conductors 30 with any suitable electrically insulative material(s) (not shown), and surrounding at least a portion of the insulative material with an electrically conductive material (not shown) that is at least partially surrounded by the insulating jacket 34.

The electrical conductors 30 may each be fabricated from any suitable electrically conductive material(s) that enables the electrical conductors 30 to electrically connect the components of the electrical device 10 and/or that enables the electrical device 10 to function as described herein, such as, but not limited to, silver, aluminum, gold, copper, other metallic conductors, non-metallic conductors, and/or the like. The electrical conductors 30 may also have any suitable configuration, shape, and/or the like that that enables the electrical conductors 30 to electrically connect the components of the electrical device 10 and/or that enables the electrical device 10 to function as described herein, such as, but not limited to, an approximately cylindrical wire (whether the wire consists of a plurality of strands or only one strand), an approximately planar shape, and/or the like. The insulating jacket 34 may be fabricated from any suitable insulative material(s) that facilitates insulating the electrical conductors 30 and/or that enables the electrical device 10 to function as described herein, such as, but not limited to, polyester, polyvinyl chloride, thermo-plastic-elastomer, and/or polyimide.

In the illustrated embodiment, the electrical connector 18 and mating electrical connector 20 are single-pin connectors having a male terminal 40 and female terminal 42 configured to mate and unmate for electrical connection and disconnection between the load 14 and the power supply 16. For example, the mating electrical connector 20 defines a plug connector and may also be referred to hereinafter as a plug connector 20. The electrical connector 18 defines a socket connector and may also be referred to hereinafter as a socket connector 18. The mating electrical or plug connector 20 is configured to be plugged into the electrical or socket connector 18 along a central longitudinal axis. In alternate embodiments, the connectors 18 and 20 may comprise other types of connectors, including, but not limited to multi-pin connectors, micro-miniature connectors, and the like. Furthermore, the connectors 18 and 20 may be formed by any suitable method, such as stamping, forging, casting, and the like. Optionally, the connectors 18 and 20 may be configured according to an industry standard including but not limited to, SAE J1772, IEC 62196, VDE-AR-E 2323-2-2, EV-Plug Alliance, and/or CHAdeMO.

In an exemplary embodiment, the male terminal 40 of the electrical connector 18 may include a pin with a mating end 44 configured for mating with the female terminal 42 of the socket connector 18 and a wire end 46 at the opposite end configured for electrical connection to the corresponding wire 24. For example, the wire 24 may be crimped to the wire end 46 at the connection point 26. However, other types of connections can be used to connect the wire 24 to the wire end 46, such as, barrel connection, butt connection, cap connection, and the like. In the illustrated embodiment, the male terminal 40 is a pin terminal. However, other types of terminals may be used in alternative embodiments, such as a post, jack, plug, blade terminal, spade terminal, fork terminal, contact, and the like.

In an exemplary embodiment, the female terminal 42 may be a socket with a mating end 48 configured for mating with the male terminal 40 of the plug connector 20, and a wire end 52 at the opposite end configured for electrical connection to the corresponding wire 22. For example, the wire 22 may be crimped to the wire end 52 at the connection point 28. However, other types of connections can be used to connect the wire 22 to the wire end 52, such as, barrel connection, butt connection, cap connection, and the like. In the illustrated embodiment, the female terminal 42 is a socket terminal. However, other types of terminals may be used in alternative embodiments, such as a female receptacle for a post, jack, plug, blade terminal, spade terminal, fork terminal, contact, and the like.

Figure 2:
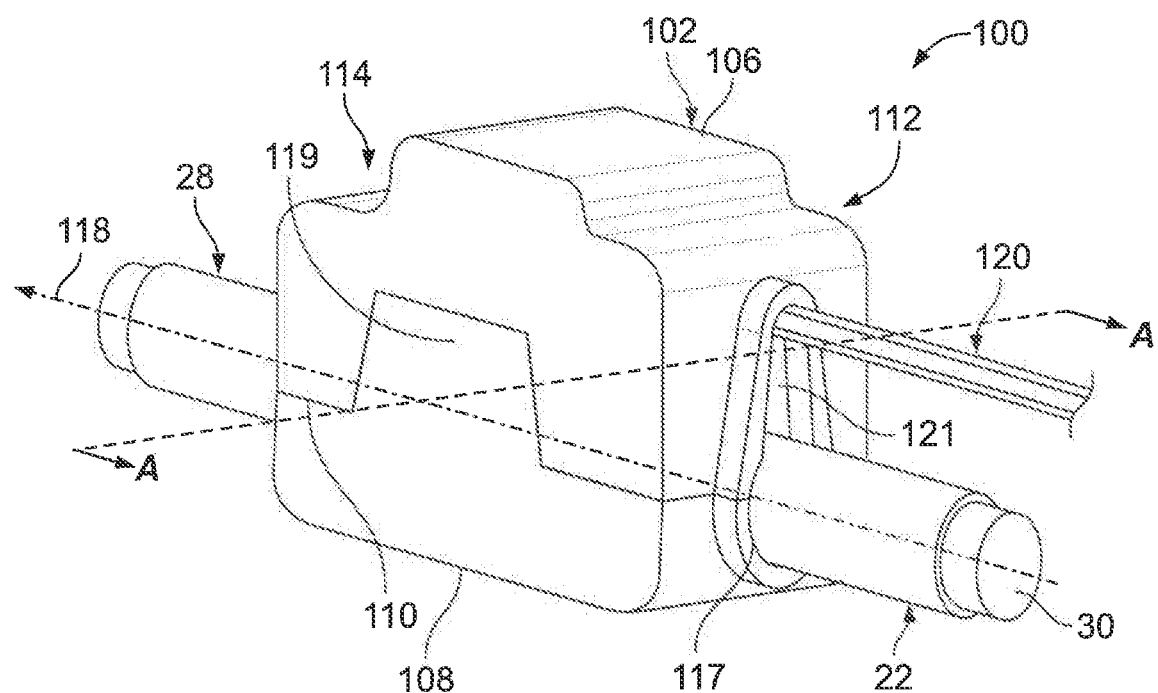
FIG. 2 is a front perspective view of a sensor assembly of the electrical device according to an embodiment.
Figure 3:
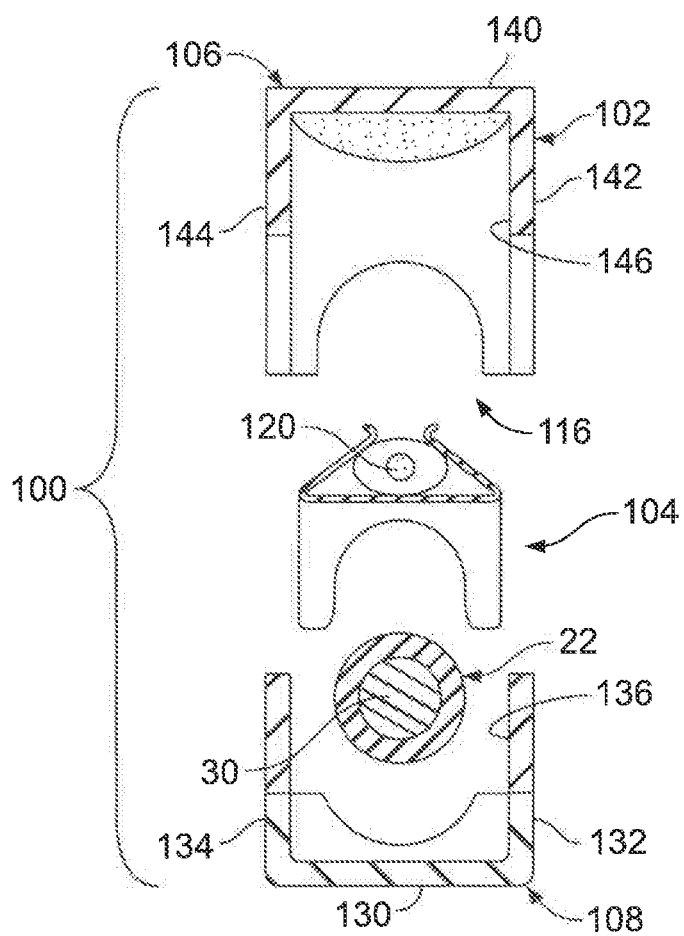
FIG. 3 is an exploded cross-section view of the sensor assembly along section A-A of FIG. 2 according to an embodiment.

FIG. 2 is a front perspective view of the sensor assembly 100 of the electrical device 10 according to an embodiment. FIG. 3 is an exploded cross-section view of the sensor assembly 100 along section A-A of FIG. 2 according to an embodiment. The sensor assembly 100 includes a housing 102, a contact member 104 configured to thermally and mechanically engage with the wire 22, and a sensor 120 operatively connected, such as thermally and mechanically, to the contact member 104 for detecting temperature conditions at the connection point 28 (FIG. 1) through a thermally conductive path, such as directly through at least one thermally conductive element. In the illustrated embodiment, the contact member 104 directly connects with a single wire 22 having a single conductor 30. However, the sensor assembly 100 may be configured to connect a multi-wire or ribbon cable having a plurality of conductors.

The housing 102 may be formed from two housing shells, an upper shell 106 and a lower shell 108, which mate or engage with each other along interfaces 110. The housing 102 has a front end 112, a rear end 114, and a cavity 116 that extends lengthwise from the front end 112 to the rear end 114 along a longitudinal axis 118. When the upper shell 106 and lower shell are mated, openings 117 are formed at the front and rear ends 112, 114 along the longitudinal axis 118 that are configured to receive the wire 22. In the illustrated embodiment, the openings 117 are substantially circular. However, the openings 117 can define any shape or dimension to receive the wire 22. For example, the opening 117 at the front end 112 includes an oblong portion 121 configured to receive the sensor 120. The shells 106, 108 may include flanges 119 along the interfaces 110 that are configured to guide the shells 106, 108 into proper mating with each other. As shown in FIG. 2, the flanges 119 are substantially trapezoidal shaped. However, the flanges 119 can be any shape or dimension to guide the shells into proper engagement.

The upper and lower shells 106, 108 may have a generally open-faced rectangular shape. More specifically, the lower shell 108 may include a lower wall 130 and opposing sidewalls 132, 134 that are connected by the lower wall 130, which extends therebetween (FIG. 3). The opposing sidewalls 132, 134 form planes that are parallel with respect to each other and extend parallel to the longitudinal axis 118. However, alternative embodiments may include sidewalls 132, 134 that are not parallel and do not oppose each other. As shown, the inner surfaces of the lower wall 130 and the sidewalls 132, 134 form an lower shell interior surface 136. Likewise, the upper shell 106 may include an upper wall 140 and opposing sidewalls 142, 144 that are connected by the upper wall 140, which extends therebetween. The inner surfaces of the sidewalls 142, 144 and the upper wall 140 may form an upper interior surface 146 and also generally extend parallel to or along the longitudinal axis 118.

Although the lower and upper interior surfaces 136, 146 have a substantially rectangular shape in FIG. 3, the lower and upper interior surfaces 136, 146 may have other shapes or configurations. For example, the upper wall 140 may be semi-circular (concave or convex) or shaped like a trough instead of being substantially planar. Also, the sidewalls 142, 144 may form a non-orthogonal angle with respect to the upper wall 140 instead of a substantially perpendicular angle as shown in FIG. 3.

In various embodiments, the upper and lower shells 106, 108 may be may be stamped, forged, molded, or otherwise formed from any suitable material, including, metal, polymer, dielectric material, composite materials, stainless steel, copper, aluminum, alloys, and the like. Optionally, the upper and lower shells 106, 108 may be stamped, forged, molded, or otherwise formed from a material that limits or prevents the transmission of EMI and/or electromagnetic radiation through the housing 102. For example, the upper and lower shells 106, 108 may be manufactured from a material having high electromagnetic radiation absorbing characteristics, such as, a low magnetic permeability factor or a low electric permittivity factor.

Optionally, the housing 102 may include a securing feature, such as heat shrink material covering the housing 102 (not shown), to secure the upper and lower shells 106, 108 to each other. Alternatively, other types of securing features may be used to secure the upper and lower shells 106, 108, such as adhesive, a tab, a latch, a retaining member, a mechanical interference fit, bonding, and the like. In alternate embodiments, the upper and lower shells 106, 108 may be removably secured to each other.

Figure 4:
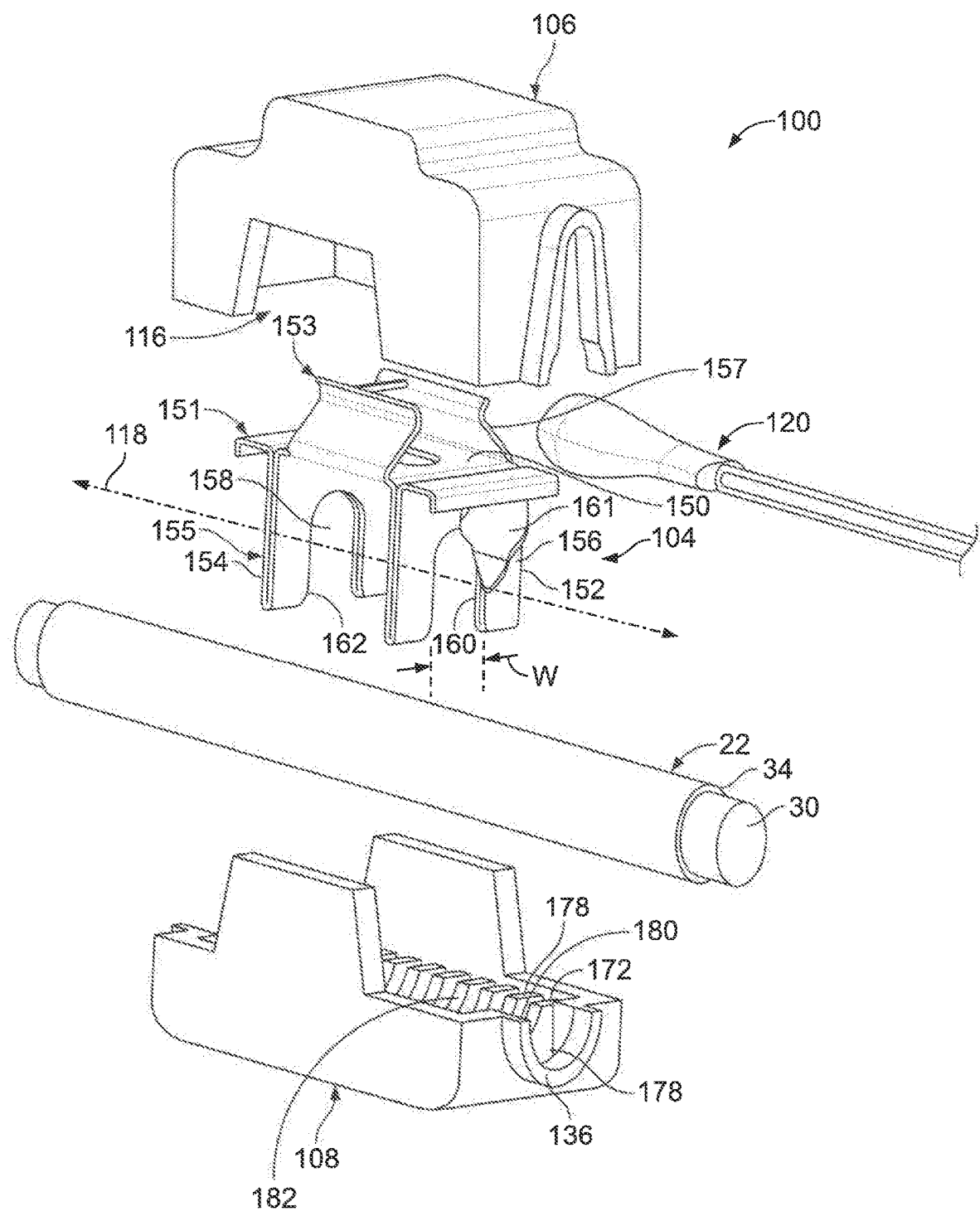
FIG. 4 is an exploded front perspective view of the sensor assembly according to an embodiment.

FIG. 4 is an exploded front perspective view of the sensor assembly 100 according to an embodiment. As shown in FIG. 4, the contact member 104 includes the sensor 120 and a contact member 151. The contact member 151 includes a sensor holding portion 153 to hold the sensor 120 and a wire contact portion 155 to contact the wire 22. The wire contact portion 155 comprises a base 150 and opposing terminals 152, 154 that extend spaced apart and generally perpendicular to the base 150, which extends therebetween. The contact member 104 is configured to reside within the cavity 116 of the housing 102 when assembled. The sensor holding portion 153 includes angled tabs 157 extending from the base 150 opposite the terminals and are configured for receiving and securing the sensor 120, such as with a mechanical interference fit. In an exemplary embodiment, the tabs 157 are generally rectangular plates that are positioned inwardly at an angle of about 45° relative to the base 150. However, the tabs 157 can be positioned at any angle. In the illustrated embodiment, the contact member 104 is positioned immediately adjacent or downstream from the connection point 28. The contact member 104 is positioned in close proximity to the connection point 28 to minimize length of the direct thermally conductive path. In alternate embodiments, the contact member 104 can be positioned anywhere along the wire, such as upstream, downstream, or remote from the connection point 28.

In the illustrated embodiment, the contact member 151 is configured to operatively connect, such as thermally and mechanically, with the sensor 120. The terminals 152, 154 form planes that are parallel with respect to each other and extend perpendicular to the longitudinal axis 118. However, alternative embodiments may include terminals 152, 154 that are not parallel and do not oppose each other. In the illustrated embodiment, the terminals 152, 154 are defined as insulation displacement contact (IDC) members or terminals. However, in alternate embodiments, one or both of the contacts might not comprise an IDC member. Instead, a different system for attaching the wire(s) 22 to the terminals 152, 154 could be provided.

Each terminal 152, 154 is configured for receiving a portion of the wire 22 and cutting through the insulating jacket 34 of the wire 22 to make a mechanical and thermal connection with the conductor 30. Each terminal 152, 154 has two legs 156 that define a slot 158 therebetween. Interior surfaces of the terminal 152, 154 define a pair of opposed blades 160 with chamfered tips 162 at the open end of the slot 158. The width (W) of the slot 158 is configured to allow piercing of, and penetration through, the insulating jacket 34, while ensuring that the conductor 30 engages and is compressed between the blades 160. Further, the width (W) is spaced so as not to compromise the integrity of the wire 22. Thus, a direct thermally conductive path may be established between the sensor 120, the base 150 and the terminals 152, 154 of the contact member 104, the conductor 30 of the wire 22, and a length of the conductor 30 to the connection point 28. In an exemplary embodiment, each terminal 152, 154 is comprised of thermally conductive material, such as stamped and formed metal. Optionally, the terminals 152, 154 are covered with a protective coating, such as a dielectric material, polymer and the like, except for the blades 160 which remain exposed to pierce the insulating jacket 30 and engage the conductor 30.

Alternatively, the terminals 152, 154 do not include blades 160 to pierce the insulating jacket 30 and engage the conductor 30 for a thermal connection. Instead, the terminals 152, 154 are configured for securing the wire 22 within the slots 158. Optionally, the contact member 104 may include contacts 161 proximate each end of the base 150. For example, each contact 161 is a substantially triangular shaped blade configured to cut or pierce through the insulating jacket 34 of the wire 22 to make a mechanical and thermal connection with the conductor 30. However, the contacts 161 may have any shape or configuration. In an exemplary embodiment, each contact 161 is comprised of thermally conductive material, such as stamped and formed metal. Optionally, the contacts 161 are covered with a protective coating, such as a dielectric material, polymer and the like, except for the tips which remain exposed to pierce the insulating jacket 30 and engage the conductor 30.

The lower shell 108 includes a plurality of interior walls 172 forming contact slots 180 therebetween that are configured to receive the terminals 152, 154 of the contact member 104. In an exemplary embodiment, each interior wall 172 extends upwardly from the lower shell interior surface 136. The interior walls 172 form planes that are parallel with respect to each other and perpendicular to the longitudinal axis 118. However, alternative embodiments may include interior walls 172 that are not parallel and do not oppose each other. Upper edges 178 of the interior walls 172 define an arcuate notch 182 configured to guide and secure the wire 22 into the slots 158. The upper edges 178 of the interior walls 172 each define an arcuate notch 182 configured to receive and align the wire 22 along the longitudinal axis 118 for insertion into the slots 158. In alternate embodiments, the notch 182 may be any shape to guide and align the wire 22 into the slots 158.

Figure 5:
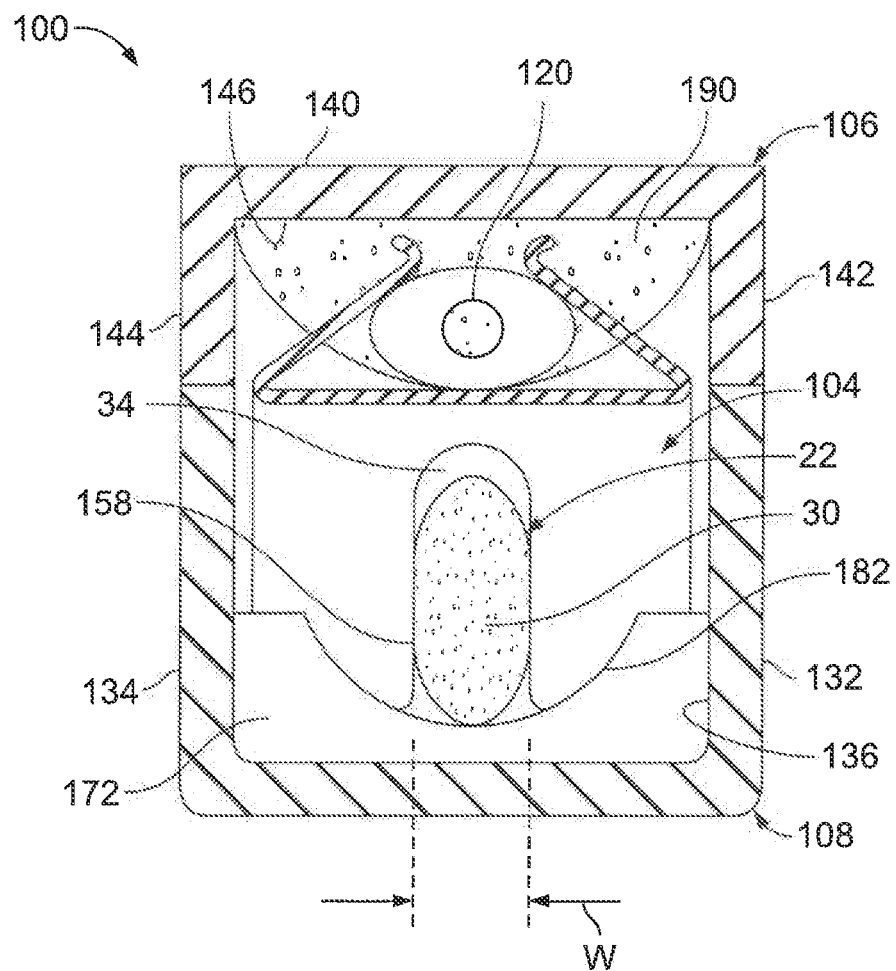
FIG. 5 is a cross-section view of the contact member in a mated position along section A-A of FIG. 2 according to an embodiment.

FIG. 5 is a cross-section view of the contact member in a mated position along section A-A of FIG. 2 according to an embodiment. To attach the sensor assembly 100 to the wire 22, the longitudinal axis of the wire 22 is aligned with the slots 158. For example, the wire 22 may be positioned within the notches 182 of the interior walls 172. The contact member 151 and the interior walls 172 of the lower shell 108 are moved towards each other to actuate or press the wire 22 into the slots 158 of the terminals 152, 154. For example, a tool (not shown) may be used to provide sufficient and even force to the upper and lower shells 106, 108. The arcuate notches 182 of the interior walls 172 contact the wire 22 to guide the wire 22 into the slots 158. As the wire 22 is pressed into the slots 158, the blades 160 and/or blades 161 pierce through the insulating jacket 34 and engage the conductor 30 and at least a portion of the terminals 152, 154 are received in corresponding contact slots 180 of the interior walls 172. The upper and lower shells 106, 108 mate along interfaces 110 to form the housing 102 and secure the wire 22 within the slots 158. Optionally, the housing may contain a sealing material 190 to secure the sensor assembly 100 and shield the components from environmental conditions. For example, the sealing material 190 may be placed along the upper interior surface 146. When the sensor assembly 100 is assembled in the mated position, the sealing material 190 covers at least a portion of the sensor 120 and/or the contact member 104 to shield the components from environmental conditions. The sealing material 190 may include, but is not limited to, silicon based gel.

The sensor 120 is configured to detect the temperature of the connection point directly through the thermally conductive path defined by the contact member 104, the conductor 30 of the wire 22, and the connection point 28. During normal operation when the sensor assembly 100 is coupled with the wire 22 in a mated position (FIG. 5), the main power circuit 12 carries a high current flowing from the power supply 16 to the load 14. The resulting resistive heating increases the temperature of the components at the connecting point 28 and thermally conducts through the thermally conductive path to the temperature sensor 120. The effectiveness of the temperature sensor 120 to rapidly and accurately sense the temperature changes at the connection point 28 is related to the length and thermal conductivity of the thermally conductive path. As the length decreases and the thermal conductivity increases, the effectiveness of the temperature sensor 120 increases. In addition, the securing the wire 22 within the sensor assembly 100 reduces environmental conditions, such as vibration, temperature, and the like that otherwise could decrease the effectiveness of the temperature sensor 120. The sensor 120 may communicate signals to the power supply 16 using a wired or wireless connection.

In the illustrated embodiment, the sensor 120 may be a surface mount thermistor, such as a positive temperature coefficient (PTC) thermistor, or a negative temperature coefficient (NTC) thermistor. A PTC thermistor increases resistance as the temperature rises, and the relationship between resistance and temperature is substantially linear. A NTC thermistor decreases resistance as the temperature increases, and the relationship between resistance and temperature is substantially non-linear. The sensor 120 may be selected based on parameters including, but not limited to size, thermal response, time response, resistance-temperature characteristic. Moreover, any type of temperature sensor may be used, such as, a bead thermistor, a disc and chip thermistor, a glass-encapsulated thermistor, a RTD sensor, a thermocouple, a diodes, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed:

1. A sensor assembly, comprising:
an upper shell;
a lower shell configured to mate together with the upper shell, the upper and lower shells forming a cavity therebetween that extends along a length of the shells, the cavity configured to receive a wire having an insulated jacket and a conductor;
a contact member positioned within the cavity, the contact member including a base and one or more terminals extending from the base, each of the one or more terminals configured to pierce the insulated jacket and engage the conductor to establish a direct thermally conductive path to a discrete location of a main circuit; and
a sensor operatively connected with the base of the contact member, the sensor being configured for detecting a temperature of the discrete location through the direct thermally conductive path conductive path wherein the contact member includes a sensor holding portion defined by angled tabs extending from the base opposite the one or more terminals and configured for receiving and securing the sensor via a mechanical interference fit.

2. The sensor assembly of claim 1, wherein each terminal has an opposed set of blades configured to pierce the insulated jacket and engage the conductor of the wire.

3. The sensor assembly of claim 1, wherein the discrete location is a connection point between a connector and a mating connector.

4. The sensor assembly of claim 1, wherein the discrete location is remote from the sensor assembly.

5. The sensor assembly of claim 1, wherein the wire includes a mating end that terminates at the discrete location, and wherein the discrete location is immediately adjacent to the mating end.

6. The sensor assembly of claim 1, wherein the sensor comprises a negative temperature coefficient thermistor or a positive temperature coefficient thermistor.

7. The sensor assembly of claim 1, wherein the sensor is configured for detection of resistive heating at the discrete location along the main circuit through the direct thermally conductive path.

8. The sensor assembly of claim 1, further comprising a sealing material within the housing configured to provide protection from environmental conditions.

9. The sensor assembly of claim 1, wherein the contact member includes multiple terminals and the base extends between and connects the multiple terminals.

10. The sensor assembly of claim 1, wherein a first portion of the sensor mechanically contacts the contact member within the cavity and a second portion of the sensor extends from the first portion outside of the cavity through an opening defined by at least one of the upper shell or the lower shell.

11. A sensor assembly, comprising:
a housing including a front end and a rear end having an opening into a cavity, the housing formed from upper and lower shells mating together along an interface that extends along a portion of the shells, the upper and lower shells forming the cavity therebetween that extends along a length of the shells, the cavity being configured to receive a wire having an insulated jacket and a conductor, the wire being configured for electrical connection to a main circuit;
a contact member mounted within the cavity of the housing, the contact member including a base and multiple terminals extending from the base such that the base extends between the terminals, each of the terminals configured to pierce the insulated jacket and engage the conductor to establish a direct thermally conductive path to a discrete location along the main circuit; and
a sensor thermally connected with the base of the contact member, the sensor being configured for detecting a temperature of the discrete location through the direct thermally conductive path.

12. The sensor assembly of claim 11, wherein the contact member includes a sensor holding portion defined by angled tabs extending from the base opposite the terminals and configured for receiving and securing the sensor via a mechanical interference fit.

13. The sensor assembly of claim 11, wherein each terminal has an opposed set of blades configured to pierce the insulated jacket and engage the conductor of the wire.

14. The sensor assembly of claim 11, wherein the sensor comprises a negative temperature coefficient thermistor or a positive temperature coefficient thermistor.

15. The sensor assembly of claim 11, wherein the sensor is configured for detection of resistive heating at the discrete location along the main circuit through the direct thermally conductive path.

16. The sensor assembly of claim 11, further comprising a sealing material within the housing configured to provide protection from environmental conditions.

17. An electrical device, comprising:
a power supply;
a load
a circuit electrically connected between the power supply and the load, the circuit having a wire with an insulated jacket and a conductor;
a housing including a front end and a rear end having an opening into a cavity, the housing formed from upper and lower shells mating together along an interface that extends along a portion of the shells, the upper and lower shells forming the cavity therebetween that extends along a length of the shells;
a contact member mounted within the cavity of the housing, the contact member including a base and multiple terminals and the base extends between and connects the multiple terminals, each of the multiple terminals configured to pierce the insulated jacket and engage the conductor to establish a direct thermally conductive path to a discrete location along the circuit; and a sensor thermally connected with the base of the contact member, the sensor being configured for detecting a temperature of the discrete location through the direct thermally conductive path.

18. The electrical device of claim 17, the sensor comprising a negative temperature coefficient thermistor or a positive temperature coefficient thermistor.

19. The electrical device of claim 17, wherein the sensor is configured for detection of resistive heating at the discrete location along the main circuit through the direct thermally conductive path.

* * * * *